(12) United States Patent
Zhang et al.

(10) Patent No.: US 11,143,771 B2
(45) Date of Patent: Oct. 12, 2021

(54) DOLOMITE MAPPING USING MULTISCALE FRACTURE CHARACTERIZATION

(71) Applicant: Saudi Arabian Oil Company, Dhahran (SA)

(72) Inventors: Si-Hai Zhang, Dhahran (SA); David Tang, Dhahran (SA); Wenbin Tan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 88 days.

(21) Appl. No.: 16/655,794

(22) Filed: Oct. 17, 2019

(65) Prior Publication Data
US 2021/0116591 A1  Apr. 22, 2021

(51) Int. Cl.
*G01V 1/30* (2006.01)
*G01V 1/34* (2006.01)

(52) U.S. Cl.
CPC .............. *G01V 1/302* (2013.01); *G01V 1/345* (2013.01); *G01V 2210/646* (2013.01)

(58) Field of Classification Search
CPC ... G01V 1/302; G01V 1/345; G01V 2210/646
See application file for complete search history.

(56) References Cited

U.S. PATENT DOCUMENTS 6,151,555 A   11/2000   Van Bemmel et al.

FOREIGN PATENT DOCUMENTS

| AU | 2016425662 | 2/2019 |
|---|---|---|
| CN | 103527184 | 4/2016 |
| CN | 105954800 | 9/2016 |
| CN | 106094052 | 11/2016 |
| CN | 109425896 | 3/2019 |
| CN | 110308487 | 10/2019 |

(Continued)

OTHER PUBLICATIONS

Yaojun Wang et al., Anisotropic characteristics of mesoscale fractures and applications to wide azimuth 3D P-wave seismic data, 2015, J. Geophys. Eng., 12, pp. 448-464.*

(Continued)

*Primary Examiner* — Mischita L Henson
(74) *Attorney, Agent, or Firm* — Fish & Richard P.C.

(57) ABSTRACT

Methods for dolomite mapping using multiscale fracture characterization include using a computer system to receive seismic data for a geographical area. The computer system identifies one or more macroscale fractures located within the geographical area based on a three-dimensional (3D) visualization of the seismic data. The computer system identifies one or more mesoscale fractures located within the geographical area based on a curvature map generated from the seismic data. The computer system identifies one or more microscale fractures located within the geographical area based on an amount of chaotic seismic reflections indicated by the seismic data. The computer system identifies a dolomite distribution of the geographical area based on the one or more macroscale fractures, the one or more mesoscale fractures, and the one or more microscale fractures. A display device of the computer system generates a graphical representation of the dolomite distribution.

17 Claims, 8 Drawing Sheets

(56) References Cited

FOREIGN PATENT DOCUMENTS

CN          110308487 A  * 10/2019  ............. G01V 1/306

OTHER PUBLICATIONS

N. De Paola et al., Fault zone architecture and deformation processes within evaporitic rocks in the upper crust, 2008, TECTRONICS, vol. 27, pp. 1-21.*
Ismot Jahan et al., Fault Detection From 3D Seismic Data and Distribution of Conjugate Faults in the Bakken Formation, Jul. 24, 2017, SPE/AAPG/SEG Unconventional Resources Technology Conference, ISBN: 978-1-61399-543-3 (Abstract) (Year: 2017).*
Gowri Srinivasan et al., Quantifying Topological Uncertainty in Fractured Systems using Graph Theory and Machine Learning, Aug. 3, 2018, www.nature.com/scientificreports/, DOI:10.038/s41598-018-30117-1, pp. 1-11 (Year: 2018).*
Aarre et al., "Seismic detection of subtle faults and fractures," Oilfield Review, vol. 24, No. 2, Summer 2012, 16 pages.
Broomhall and Allen, "Regional caprock-destroying dolomite on the Middle Jurassic to Early Cretaceous Arabian shelf," SPE-13697, Dec. 1987, 7 pages.
Chopra and Marfurt, "Seismic attributes for prospect identification and reservoir characterization," Society of Exploration Geophysicsts and European Association of Geoscientists and Engineers, 2007.
Chopra and Marfurt, "Understanding the seismic disorder attribute and its applications," the Leading Edge, vol. 35, No. 8, Aug. 2016, 8 pages.
Gogoi and Ghosh, "Interpretation of Seismic data for thrust/fault identification using variance and inverse of variance attribute analysis," Journal of Independent Geophysical Union, vol. 21, No. 6, Nov. 2017, 7 pages.
Leach and Rowan, "Genetic link between Ouachita foldbelt tectonism and the Mississippi Valley-type lead-zinc deposits of the Ozarks," Geology vol. 14, Nov. 1986, 5 pages.
Ogiesoba and Hart, "Fault imaging in hydrothermal dolomite reservoirs: A case study," Geophysics, vol. 74, No. 3, May-Jun. 2009, 12 pages.
Oliver, "Fluids expelled tectonically from orogenic belts: their role in hydrocarbon migration and other geologic phenomena," Geology, vol. 14, Feb. 1986, 4 pages.
Randen et al.. "Automatic extraction of fault surfaces from three dimensional seismic data," in SEG Technical Program Expanded Abstracts, Society of Exploration Geophysicists, Jan. 1999, 5 pages.
Wang and Szata, "Rock physics lithology and porosity prediction in carbonate reservoirs," in SEG Technical Program Expanded Abstracts, Society of Exploration Geophysicists, Jan. 1999, 4 pages.
Jing et al., "Study of the presalt dolomite reservoir prediction in the East Margin of Pre-Caspian Basin," in SEG Technical Program Expanded Abstracts, Society of Exploration Geophysicists, Nov. 2012, 5 pages.
Wennberg et al., "The characteristics of open fractures in carbonate reservoirs and their impact on fluid flow: a discussion," Petroleum Geoscience, Feb. 2016, 22(1):91-104.
PCT International Search Report and Written Opinion in International Appln. No. PCT/US2020/055522, dated Feb. 4, 2021, 17 pages.

* cited by examiner

Receive, by a computer system, three-dimensional (3D) seismic data for a geographical area
804

Identify, by the computer system, one or more macroscale fractures located within the geographical area based on a 3D visualization of the 3D seismic data
808

Identify, by the computer system, one or more mesoscale fractures located within the geographical area based on a curvature map generated from the 3D seismic data
812

Identify, by the computer system, one or more microscale fractures located within the geographical area based on an amount of chaotic seismic reflections indicated by the 3D seismic data
816

Identify, by the computer system, a dolomite distribution of the geographical area based on the one or more macroscale fractures, the one or more mesoscale fractures, and the one or more microscale fractures
820

Generate, on a display device of the computer system, a graphical representation of the dolomite distribution
824

FIG. 8

DOLOMITE MAPPING USING MULTISCALE FRACTURE CHARACTERIZATION

TECHNICAL FIELD

This description relates generally to dolomite and reservoir mapping using fracture characterization.

BACKGROUND

Traditional methods for dolomite and reservoir mapping are usually based on measuring reservoir quality, such as porosity. Such methods are sometimes inadequate because they identify lithology, minerals and porosity at well locations only.

SUMMARY

Methods for dolomite mapping using multiscale fracture characterization are disclosed. The methods provide a unique way to constrain dolomite mapping and reservoir quality in three-dimensional (3D) space. In some implementations, the methods include using a computer system to receive seismic data for a geographical area. The computer system identifies one or more macroscale fractures located within the geographical area based on a 3D visualization of the seismic data. The computer system identifies one or more mesoscale fractures located within the geographical area based on a curvature map generated from the seismic data. The computer system identifies one or more microscale fractures located within the geographical area based on an amount of chaotic seismic reflections indicated by the seismic data. The computer system identifies a dolomite distribution of the geographical area based on the one or more macroscale fractures, the one or more mesoscale fractures, and the one or more microscale fractures. A display device of the computer system generates a graphical representation of the dolomite distribution.

DETAILED DESCRIPTION

The implementations disclosed use mechanisms for onshore and offshore dolomitization of a geographical area to map depositional and structural characteristics of the geographical area. In some mechanisms, lateral, compaction-induced migration of magnesium-rich brines from a fluid source to a target formation occur during burial. Compaction, due to either normal burial or tectonic compression, results in large-scale lateral and upward brine movement. In other mechanisms, fault-related, hydrothermal dolomitization occur by migration of brines upward along fractures or faults. Both mechanisms reveal that brine movement is a factor in the dolomitization process and fractures or faults as pathways or conduits of brine movement control dolomite geometry. In tectonic compression, lateral brine flow produces thick, tabular dolomite bodies, distributed over hundreds of square miles. In hydrothermal dolomitization, vertical flow along faults and fractures tends to produce narrow, linear dolomite bodies. Thus, a fault or a fracture serving as a migration pathway or conduit is associated with dolomitization and considered as an indicator of dolomitization.

Methods and systems for dolomite mapping based on seismic multiscale fracture characterization are disclosed. Fractures and faults occurring underground over a geographical area are categorized into three types: macroscale, mesoscale and microscale fractures according to a fracture size and a seismic wavelength. A seismic volume within an area of interest is selected to characterize the three types of fractures. Image processing is performed on the seismic volume to recognize macroscale fractures (faults). A curvature map is generated from the seismic volume to recognized mesoscale fractures. Chaos and variance are generated from the seismic volume to recognize microscale fractures. In some implementations, the seismic attribute maps are extracted along a target formation from the seismic volume and combined into a composite fracture map. The dolomite distribution is identified on the composite fracture map in accordance with a dolomitization mechanism. Further, a potential area for stratigraphic-diagenetic traps is identified.

Among other benefits and advantages, the methods provide a flexible and integrated framework for characterization of brine conduits in accordance with three different scales. The methods identify both porous as well as tight dolomite distributions by characterizing fracture using seismic attributes. Tight dolomite can be a seal in a petroleum system. The term "tight" refers to reduced porosity. The implementations disclosed thus provide accurate mapping of dolomite and reservoirs, leading to production efficiencies compared to traditional methods.

Figure 1:
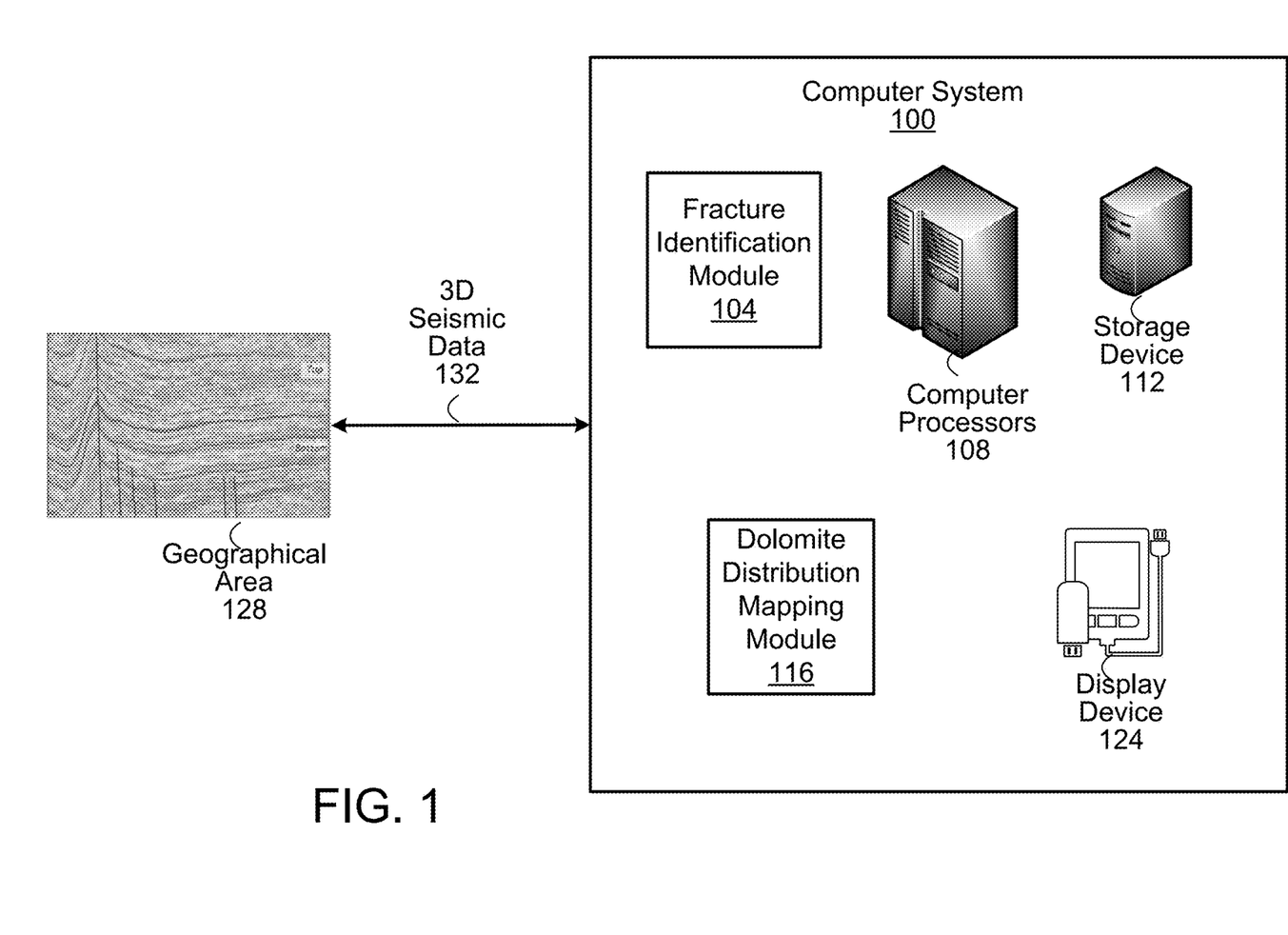
FIG. 1 illustrates a computer system for dolomite mapping using multiscale fracture characterization, in accordance with one or more implementations.

FIG. 1 illustrates a computer system 100 for dolomite mapping using multiscale fracture characterization, in accordance with one or more implementations. Dolomite is an anhydrous carbonate mineral composed of calcium magnesium carbonate. Dolomite is in most cases used to determine presence of hydrocarbon reserves. Among other components and parts, FIG. 1 illustrates a geographical area 128, seismic data 132, and the computer system 100. Seismic instrumentation measuring the seismic data 132 for the geographical area 128 is communicably coupled to the computer system 100 over a network (such as the Internet or a local network).

The geographical area 128 represents a shelf or a basin containing hydrocarbon reservoirs. Lateral or vertical migration of brine occurs from underlying halite along faults or fractures across the geographical area 128. In some implementations, faults lying within the geographical area 128 are mapped using the seismic data 132. In some implementations, fractures are identified within dense dolomite reservoirs of the geographical area 128 using seismic data to correlate fracture density to lithology. In some implementations, petrophysical properties and seismic velocities are measured across the geographical area 128 to predict a lithology in the geographical area 128 involving carbonate rocks. Using the implementations disclosed, the seismic data 132 obtained for the geographical area 132 is used to predict locations for drilling exploration wells to bring petroleum oil hydrocarbons and natural gas to the surface.

The seismic data 132 provides a visualization of the subsurface of the Earth using seismic waves to map geologic structures of the geographical area 128 for determining the location of oil and gas reservoirs. In some implementations, the seismic data 132 is captured by a geophone. As the sound waves vibrate into the geophone, the seismic data 132 are recorded on magnetic tape or printed as traces of the subsurface. A path of a wavelet of the seismic data 132 reveals a contour of the geologic structure of the geographical area 128. The seismic data 132 is two-dimensional (2D) or three-dimensional (3D). In some implementations, the seismic data 132 includes an additional horizontal axis, creating the perception of depth and providing additional data points for a potentially more accurate geophysical survey. In other implementations, the seismic data 132 is four-dimensional, such as 3D seismic data acquired at different times to assess changes in a producing hydrocarbon reservoir with time.

In some implementations, the seismic data 132 includes multiple seismic traces. A seismic trace refers to a curve recorded by a seismograph when measuring ground movement. Each seismic trace includes an (X, Y) coordinate within the geographical area 128. The (X, Y) coordinate enables different locations in the geographical area 128 to be specified by a set of numbers, letters, or symbols. The seismic trace further includes a seismic travel time corresponding to the (X, Y) coordinate. The seismic travel time refers to a time taken by a seismic wave to travel from the geologic structure of the geographical area 128 to the (X, Y) coordinate. The seismic trace further includes a depth corresponding to the (X, Y) coordinate. The depth is derived from an acoustic wave travel time, based on an acoustic velocity of the subsurface medium (such as sediments, rocks, water, or a combination).

The computer system 100 is used for seismic multiscale fracture characterization and dolomite mapping of the geographical area 128 using the seismic data 132. The computer system includes one or more computer processors 108, a storage device 112, a fracture identification module 104, a dolomite distribution module 116, and a display device 124. The computer processors 108 are computer hardware (such as application-specific integrated circuits or microprocessors) used to perform the methods disclosed. The storage device 112 is implemented as a hard drive or cloud storage and is used to store data (such as the received seismic data 132, a 3D visualization of the seismic data 132, data indicating identified fractures, or a composite fracture map of the geographical area 128) and instructions to perform the methods disclosed.

The fracture identification module 104 performs seismic multiscale fracture characterization and identifies the three types of fractures. The identified macroscale fractures, mesoscale fractures, and the microscale fractures indicate directions of lateral brine migration within the geographical area 128. Data describing the identified fractures or faults are stored in the storage device 112. The fracture identification module 104 is implemented in software using the computer processors 108 or in special-purpose hardware, such as application-specific integrated circuits.

The fracture identification module 104 categorizes fractures among three types: macroscale, mesoscale and microscale fractures according to a size of the fracture size and a seismic wavelength. The size of a macroscale fracture is much greater than the seismic wavelength and is a field-wide fault. The seismic wavelength depends on the frequency and velocity of the seismic wave and can range from 1 centimeter (cm) to 1 kilometer (km). The seismic wavelength is typically 10-100 meters (m). Hence, Macroscale fractures are measured on a kilometer scale. The size of a macroscale fracture can be 1 km-100 km. The size of a mesoscale fracture is greater than or equal to the seismic wavelength. Mesoscale fractures have a distribution of stratigraphic and lithological intervals. Mesoscale fractures are measured on a meter scale. The size of a mesoscale fracture can be 1 m-1 km. Microscale fractures are far smaller than the seismic wavelength and are distributed in accordance with cross-bedding and ripple lamination. Microscale fractures are measured on a centimeter scale. The size of a microscale fracture can be 1 micron-1 cm.

The fracture identification module 104 selects a 3D volume of the seismic data 132 within an area of interest. The seismic data 132 is previously processed to the form of a 3D data set used for seismic data interpretation. The seismic data 132 thus includes multiple sets of seismic traces organized into lines. Each trace has an (X, Y) coordinate. Each data point of a trace corresponds to a certain seismic travel time or depth.

In some implementations, the fracture identification module 104 identifies one or more macroscale fractures located within the geographical area based on a 3D visualization of the 3D volume of the seismic data 132. The size of a macroscale fracture is much greater than the seismic wavelength and is a field-wide fault (measured on a kilometer scale). Because of their large sizes, macroscale fractures have an apparent seismic response that is interpreted by performing image processing on the seismic data 132. The fracture identification module 104 uses image processing methods, such as edge detection, to process an image of one or more fault polygons based on the seismic data 132. The geologic formation is represented by a polygon bounded by faults, unconformities, or a lateral extent. The polygonal lines correspond to faults on a vertical seismic section. The fracture identification module 104 identifies one or more macroscale fractures by determining an orientation of the one or more macroscale fractures based on the image of the one or more fault polygons.

In some implementations, the fracture identification module 104 identifies one or more mesoscale fractures located within the geographical area 128 based on a curvature map generated from the 3D volume of the seismic data 132. The size of a mesoscale fracture is a little greater than or equal to the seismic wavelength. Thus, mesoscale fractures are more difficult to identify than macroscale fractures on a seismic section, but are identified using seismic attributes, such as curvature. A curvature map refers to a texture derived from the seismic data 132 that stores the convexity and concavity of the geologic formation. Curvature is defined in two dimensions as the radius of a circle tangent to a curve. The fracture identification module 104 analyzes anticlines and synclines to identify the mesoscale fractures. Anticlines are defined as having positive curvature and synclines as having negative curvature. A linear (straight-line) portion of a curve has zero curvature. Thus, a portion having a constant dip exhibits zero curvature. Locally, a 2D line is approximated by a parabolic curve of the form $z(x)=a+bx+kx^2$. The curvature coefficient, k, is inversely proportional to the radius of curvature. An example of an identified mesoscale fracture is illustrated and described in more detail later with reference to FIG. 3.

In some implementations, the fracture identification module 104 identifies one or more microscale fractures located within the geographical area 128 based on an amount of chaotic seismic reflections indicated by the 3D volume of the seismic data 132. Microscale fractures are far smaller than the seismic wavelength and are distributed in accordance with cross-bedding and ripple lamination (measured on a centimeter scale). The seismic wavelength can be 1 m-1 km (typically 100 m) and a microscale fracture is typically less than 1 m (typically 1 cm). Hence, a microscale fracture is typically $10^4$ times smaller than the seismic wavelength. A microscale fracture is observed on core samples and thin sections. A thin section is typically 1 cm. Chaotic reflections indicate gravity-driven deposits, debrites, and a lack of lateral continuity. In some implementations, the fracture identification module 104 generates a chaos and a variance based on the seismic data 132. The chaos and the variance are indicative of the amount of chaotic seismic reflections.

Chaos refers to an attribute used to detect chaotic textures within the seismic data 132, such as caused by a microscale discontinuous character of coarse-grained sediments. The chaos attribute is based on an eigenanalysis of a 3×3 gradient structure tensor. If the first eigenvalue is large, the corresponding first eigenvector defines the normal to a local plane of constant amplitude waveforms. If the three eigenvalues are equal, the data is determined to be totally chaotic. The chaotic signal pattern contained within the seismic data 132 is a measure of a lack of organization in the dip and azimuth estimation method. Chaos in the signal is thus used to illuminate faults and discontinuities, and for seismic classification of the chaotic texture.

Variance refers to an edge-based attribute that images a microscale discontinuity of the seismic data 132. The variance attribute is used for delineating microscale faults on horizon slices and the vertical seismic profile. Variance is defined as a degree to which an amplitude of each seismic data sample in the seismic data 132 varies about an average amplitude. Variance is the opposite of coherence, hence variance is determined using a trace-to-trace variability in a certain sample interval using seismic traces from the seismic data 132. The variance produces an interpretable lateral change in the seismic amplitude and leads to reduced-variance coefficients on the one hand. The variance is measured relative to a threshold variance of the geographical area 128. For example, if the determined variance is less than a threshold of 0.2, the variance is considered to be minimal. On the other hand, greater-variance coefficients signify greater discontinuities in the case of inverse variance. Continuing the example, a variance greater than 0.2 is considered significant. The threshold variance changes based on variance measurements across the geographical area 128.

Both variance and chaos illustrate the seismic chaotic texture within the seismic data 132 and represent microscale fractures. However, a subtle difference between the determined variance and chaos attributes indicates that variance and chaos represent different aspects of chaotic reflections. Therefore, in some implementations, the determined variance and chaos are combined to represent the microscale fractures within the area of interest.

The dolomite distribution module 116 identifies a dolomite distribution using a composite fracture map. The composite fracture map is stored in the storage device 112. The dolomite distribution module 116 is implemented in software using the computer processors 108 or in special-purpose hardware, such as application-specific integrated circuits.

The dolomite distribution module 116 identifies a dolomite distribution of the geographical area 128 based on the macroscale fractures, the mesoscale fractures, and microscale fractures. In some implementations, the dolomite distribution module 116 aggregates the macroscale fractures, the mesoscale fractures, and the microscale fractures into a composite fracture map of the geographical area 128. The composite fracture map refers to an aggregation of the individual seismic attribute maps along the target formation combined into a single fracture map. The dolomite distribution is identified based on the composite fracture map. The composite map shows a distribution of the fractures including macroscale, mesoscale, and microscale fractures. The fractures (brine conduits) control the dolomite geometry and are an indicator of the dolomite distribution. The dolomite distribution is determined by the dolomitization mechanism. Therefore, the fracture distribution is used to represent the dolomite distribution.

The dolomite distribution module 116 further identifies one or more diagenetic traps at the geographical area 128 based on the dolomite distribution. A diagenetic trap occurs when a sedimentary rock that would ideally have a uniform porosity and permeability is locally modified during diagenesis such that it becomes a barrier to petroleum migration. The dolomite distribution module 116 identifies the diagenetic traps located on a border of the dolomite distribution. The dolomitization process transforms the reservoir quality in accordance with the dolomitization mechanism. Under-dolomitization makes the formation porous and preserves porosity. Over-dolomitization makes the formation tight and decreases porosity. Therefore, the dolomite front where under-dolomitization occurs can be a reservoir having greater porosity, where a location of over-dolomitization can be a seal having reduced porosity. The methods disclosed are used to uncover the locations of the reservoir and the seal. Hence, such locations are used to locate the potential diagenetic traps.

The display device 124 displays results of the processing by the processors 108. The display device 124 is implemented as a digital display on a smartphone, laptop, tablet, or desktop. The computer system 100 generates, on the display device 124, a graphical representation of the dolomite distribution. An example graphical representation of a dolomite distribution is illustrated and described with reference to FIG. 2. Further, the computer system generates a graphical representation of the one or more diagenetic traps on the display device 124.

Figure 2:
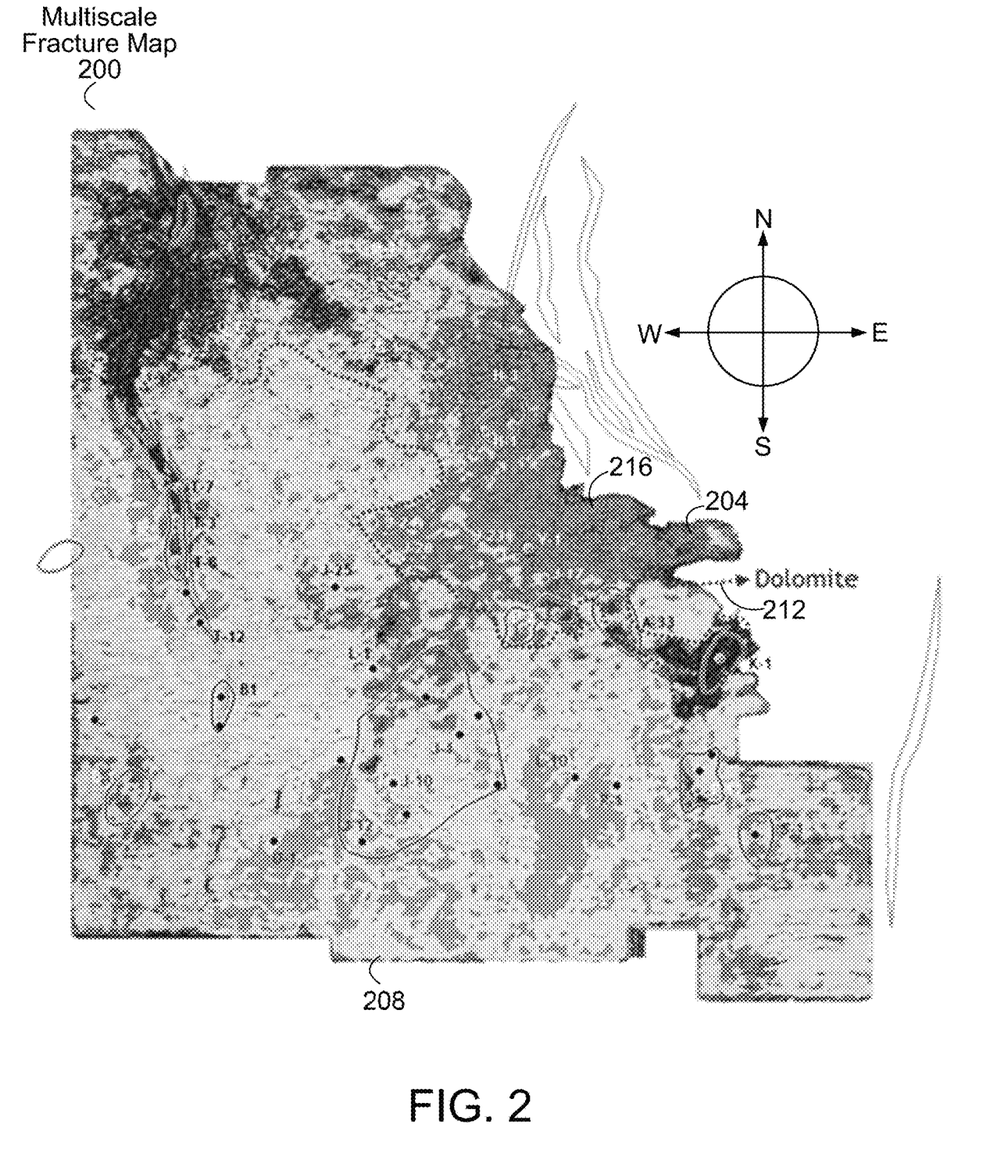
FIG. 2 illustrates an example multiscale fracture map 200, in accordance with one or more implementations.

FIG. 2 illustrates an example multiscale fracture map 200. The fractures corresponding to the micro, meso, and macro scales are identified by picking based on image attributes, curvature, and chaos and variance, respectively. The fractures are used to predict the lateral dolomite distribution 204 shown towards the East in the multiscale fracture map 200. A massive dolomite region (region 216) is heterogeneously distributed and developed towards the Northeast in the multiscale fracture map 200. A southward decrease (region 208) in dolomite content is visible in FIG. 2. The dashed line 212 delineates a dolomite front in the multiscale fracture map 200.

Figure 3:
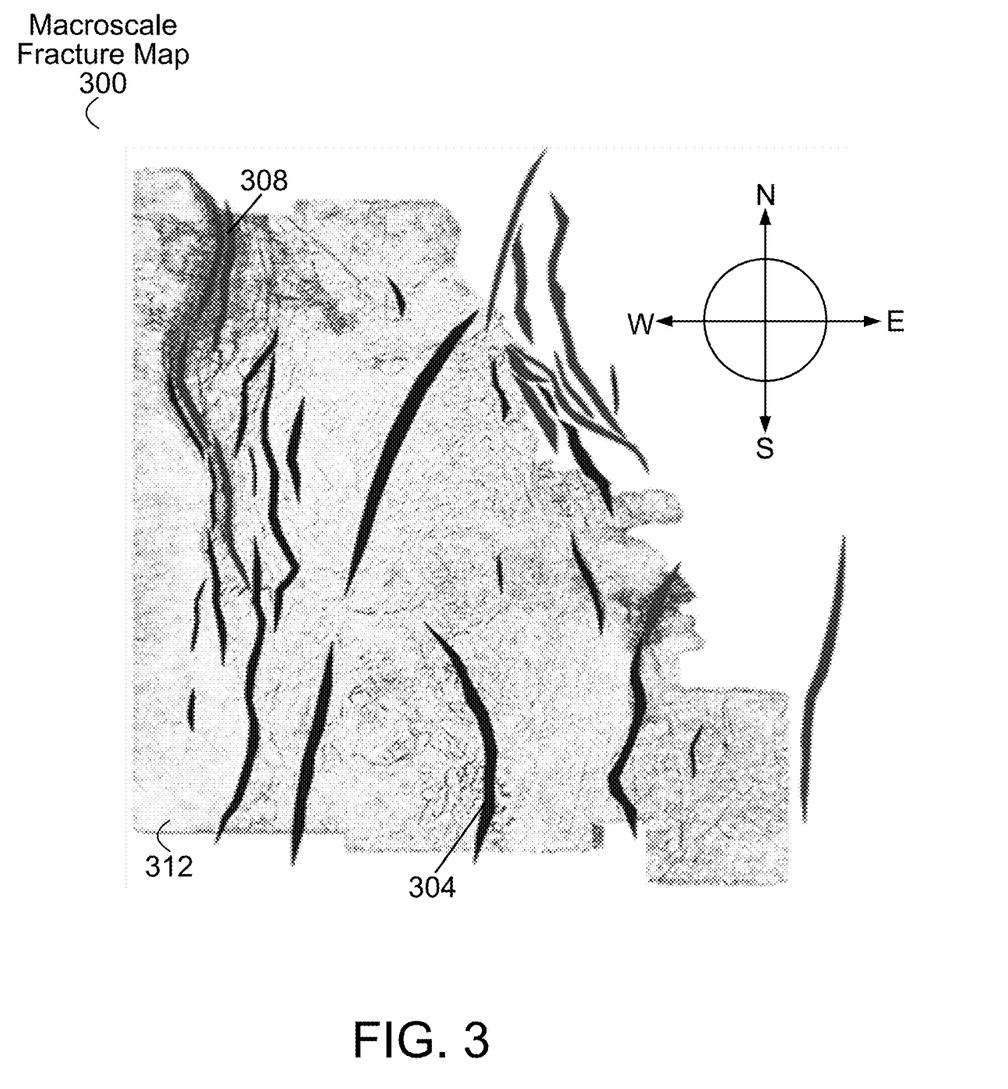
FIG. 3 illustrates a macroscale fracture map for dolomite mapping, in accordance with one or more implementations.

FIG. 3 illustrates an example macroscale fracture map 300 for dolomite mapping, in accordance with one or more implementations. The macroscale fracture map 300 includes a fault polygon 304 and a macroscale fracture 308.

The macroscale fracture 308 is identified using image processing on the apparent seismic response as described in more detail with reference to FIG. 1. The fracture identification module 104 associates the macroscale fracture 308 with a massively lateral brine migration temporally and spatially by generating the macroscale fracture map 300 shown in FIG. 3. The fracture identification module 104 is illustrated and described in more detail with reference to FIG. 1. The fault polygons depicted in FIG. 3 show that the macroscale fractures strike North-South or nearly North-South over the geographical area 312 and concentrate in the West and Northeast. The orientation and location of the fault polygons indicate that the macroscale fractures shown in FIG. 2 laterally connect a fluid source in the North to the target formation. The timing determined for the macroscale fractures formation determines whether the macroscale fractures are relevant to the dolomitization in the target interval.

In some implementations, the fracture identification module 104 combines the fault interpretation output and the formation surfaces for visualization in a 3D space to analyze the relationship of dolomitization to macroscale fracture formation. When the macroscale fractures do not reach the target interval (such as the fault polygon 304 in the South of the geographical area 312), the macroscale fractures do not represent an effective pathway of dolomitization. When the macroscale fractures reach or go through the target interval (such as the macroscale fracture 308 in the Northwest), the macroscale fractures represent the pathway from the fluid source to the target interval. Therefore, the macroscale fractures in the Northwest (such as the macroscale fracture 308) that reaches and goes through the target interval are main pathways of brine migration.

Figure 4:
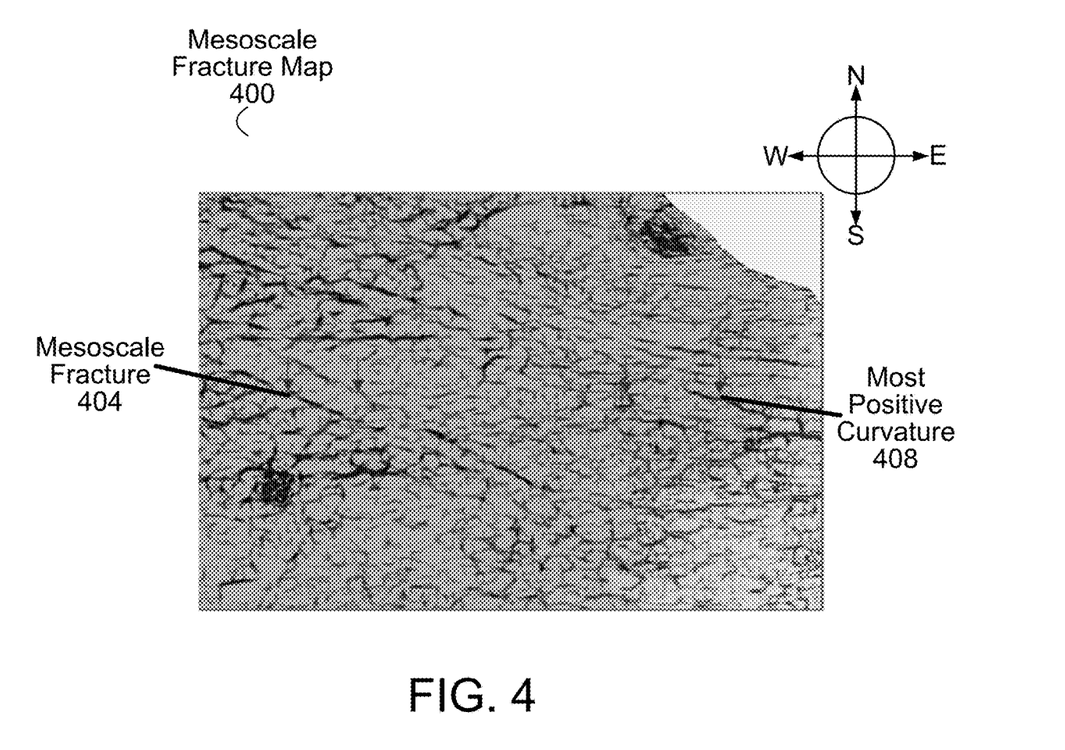
FIG. 4 illustrates a mesoscale fracture map for dolomite mapping, in accordance with one or more implementations.

FIG. 4 illustrates a mesoscale fracture map 400 for dolomite mapping, in accordance with one or more implementations. The mesoscale fracture map 400 includes a mesoscale fracture 404 and a region of most positive curvature 408. The mesoscale fracture 404 is identified using a curvature map as described in more detail with reference to FIG. 1.

FIG. 4 illustrates an example of the most-positive curvature volume generated by the fracture identification module 104. The curvature map is extracted along the target formation to identify the mesoscale fracture 404. In the mesoscale fracture map 400, large most-positive curvatures concentrate in the Southwest and Northeast. The curvature here represents mesoscale fractures. The curvature is determined similarly to the variance as described with reference to FIG. 1. The values of curvature are determined relative to the average curvature of the geographical area 128. In some implementations, the curvature ranges from 0-6. For example, a curvature value greater than 2 is considered large, and a curvature value smaller than 2 is considered small. To identify the mesoscale fractures, such as the mesoscale fracture 404, using the curvature map, further interpretation and cross validation is performed. The mesoscale fractures are thus identified using the most positive curvature, such as the most positive curvature 408.

Figure 5:
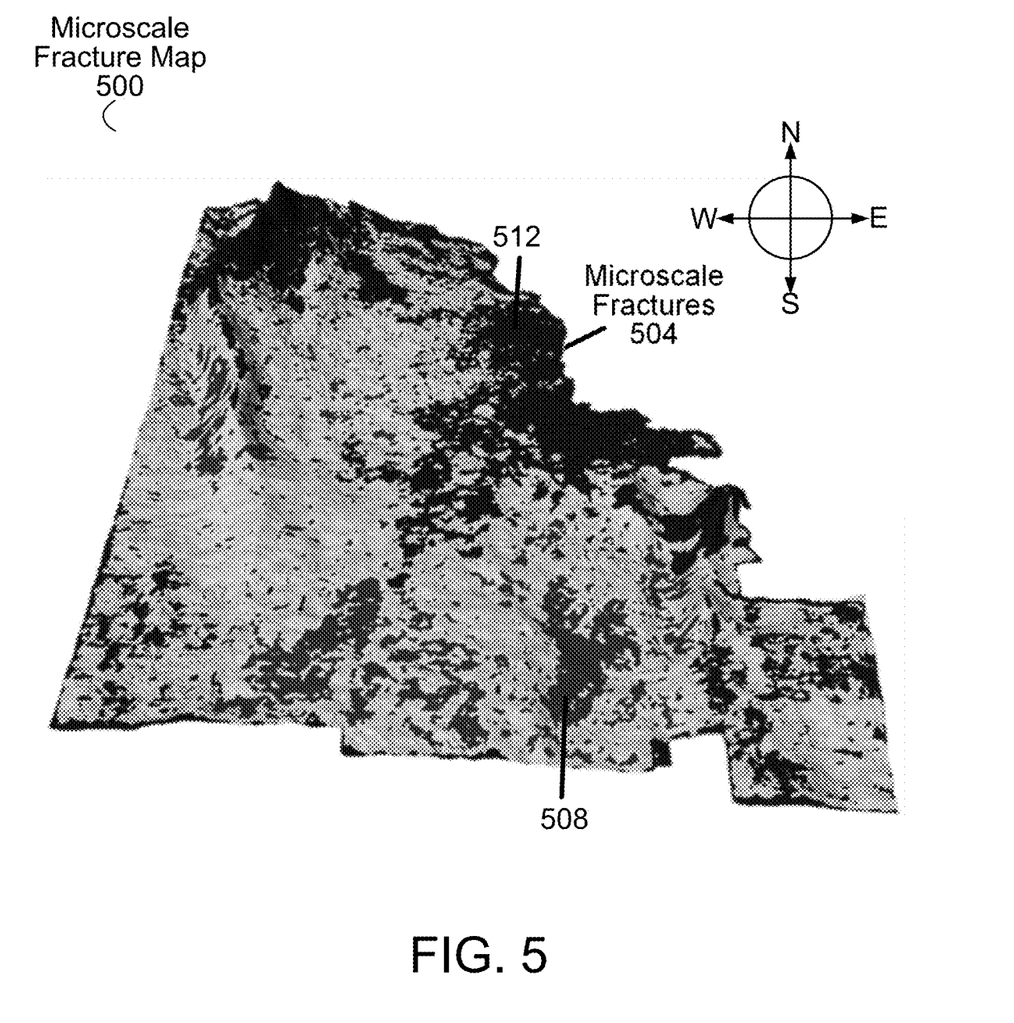
FIG. 5 illustrates a microscale fracture map for dolomite mapping, in accordance with one or more implementations.

FIG. 5 illustrates a microscale fracture map 500 for dolomite mapping, in accordance with one or more implementations. The microscale fracture map 500 includes multiple microscale fractures 504. Microscale fractures are far smaller than the seismic wavelength and are observed on core samples and thin sections. The seismic attributes of variance and chaos are used to characterize the seismic reflection chaoticness and identify the microscale fractures 504.

In the microscale fracture map 500, a distinct pattern is observed by the imaging log and the corresponding seismic section. Two reservoirs 508, 512 representing a massive dolomitized area (512) and a non-dolomitized area (508) are shown. The reservoir 508 to the South contains little dolomite. A dipmeter plot for the reservoir 508 can be used to display a small plane angle (less than 10°) that corresponds to continuous seismic reflections across the stratigraphic intervals to be investigated. In contrast, the reservoir 512 to the North contains a massively dolomitized interval (for example, over 1000 feet thick), which displays a large range of dip angle (0-30°) and chaotic seismic reflections. An example correlation of seismic data and microscale fractures identified by dipmeter plots is illustrated and described in more detail with reference to FIG. 6. The development of the microscale fractures 504 results in the chaotic seismic reflection characteristics observed.

In FIG. 5, the variance and chaos generated along the target formation reveal the chaotic seismic reflections in the Northern and the Eastern areas of the microscale fracture map 500. The identified faults in the North and East are located in the most discontinuous and chaotic area in the variance and the chaos maps. In some implementations, segments of seismic sections at the different locations are extracted to validate the microscale fracture prediction using variance and chaos. Segments having chaotic reflections are located in the more discontinuous and chaotic area (such as reservoir 512) while the segments having continuous reflections are located in an area (such as reservoir 508) having a smaller variance. Variance as an indicator of reflection chaoticness is illustrated and described in more detail with reference to FIG. 7.

Figure 6:
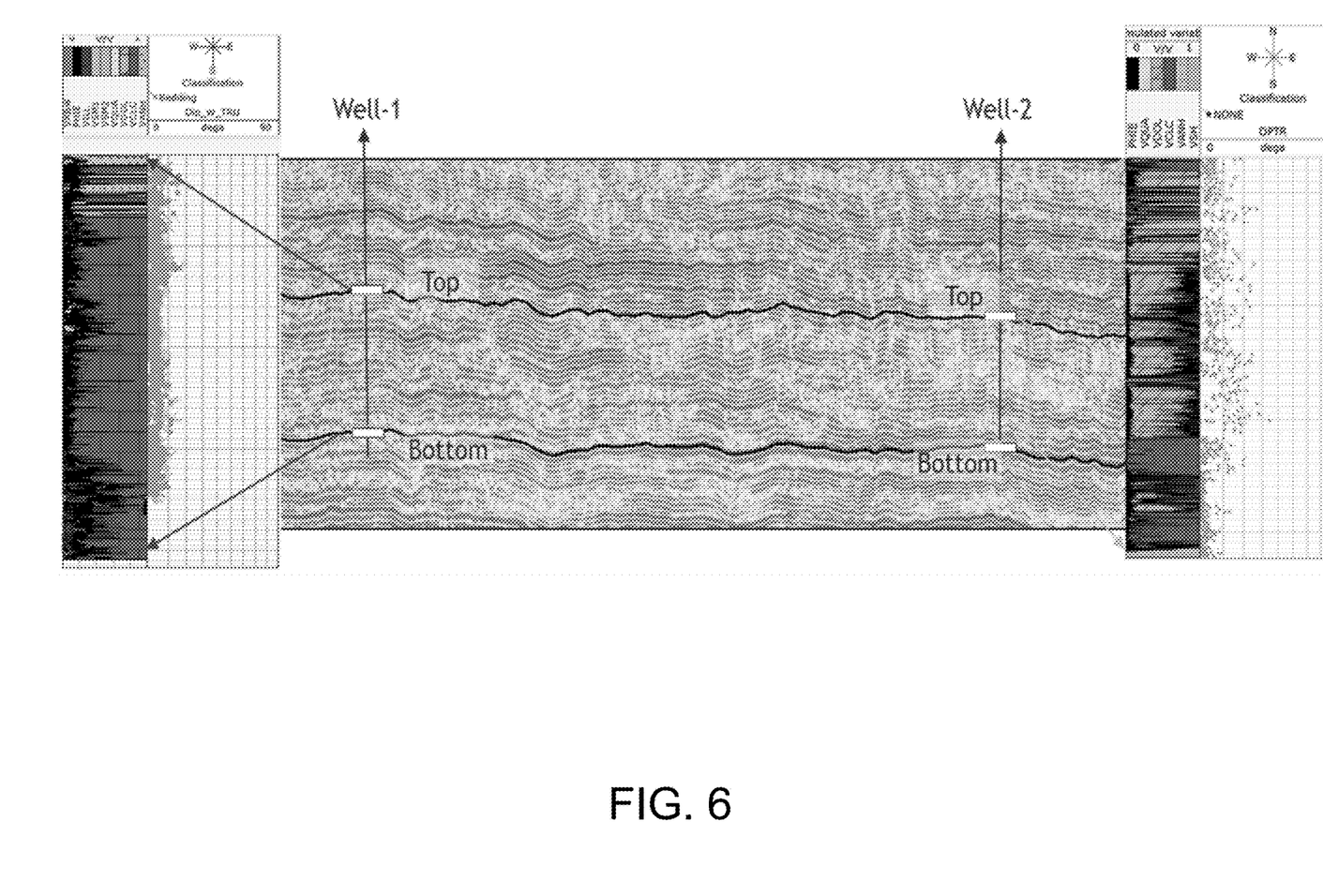
FIG. 6 illustrates an example correlation of seismic data and microscale fractures identified by dipmeter plots, in accordance with one or more implementations.

FIG. 6 illustrates an example correlation of seismic data and microscale fractures identified by dipmeter plots. In FIG. 6, the Well-1 to the West has a reduced plane angle that corresponds to very continuous seismic reflections across the interval examined. In contrast, the Well-2 to the East has a large range of dip angle (0-30°) and chaotic seismic reflections. The chaotic seismic reflection characteristics are an indicator of microscale fractures development. The association of dolomite occurrence and microscale fractures indicates that regional massive dolomite distribution is seismically mappable using fracture characterization.

Figure 7:
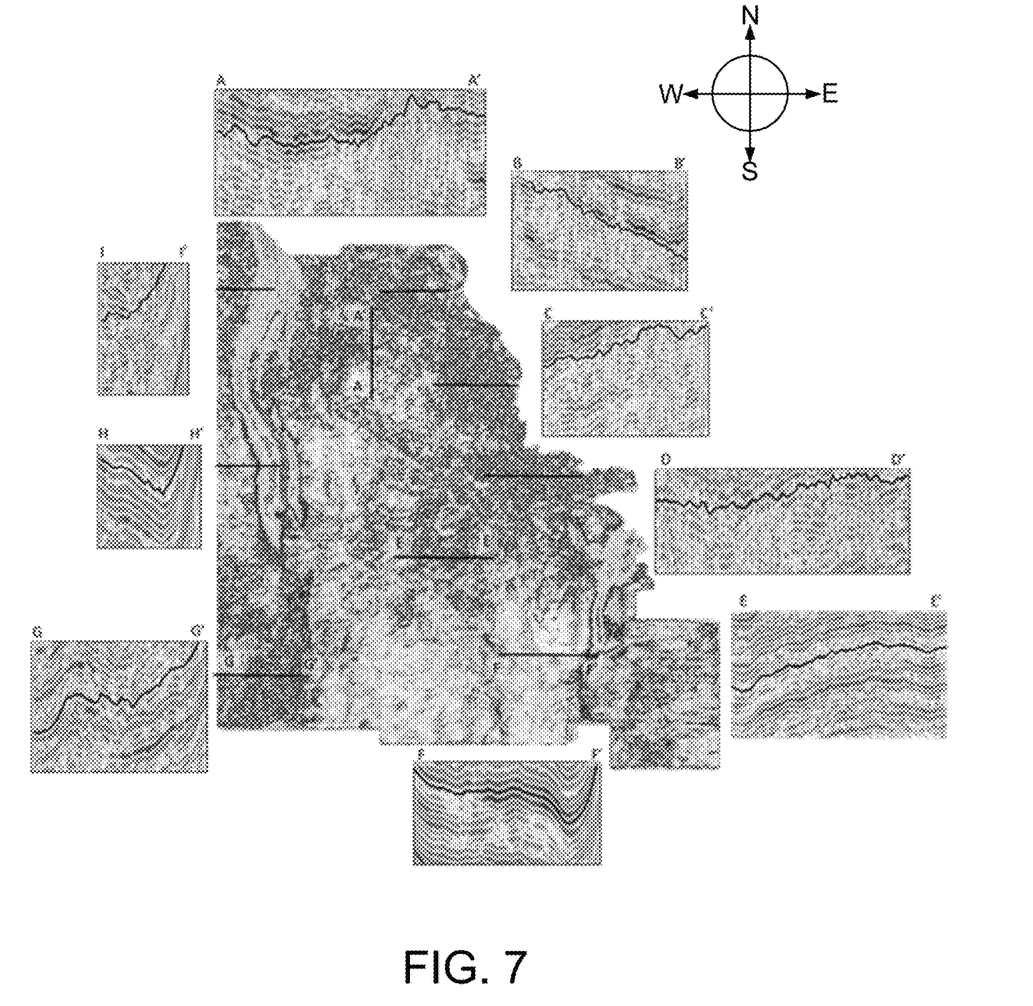
FIG. 7 illustrates variance as an indicator of reflection chaoticness, in accordance with one or more implementations.

FIG. 7 illustrates variance as an indicator of reflection chaoticness. The segments in FIG. 7 having continuous reflections (AA', FF' and HH') have less variance while the segments having chaotic reflections (BB', CC', DD', EE' GG' and II') have greater variance.

Figure 8:
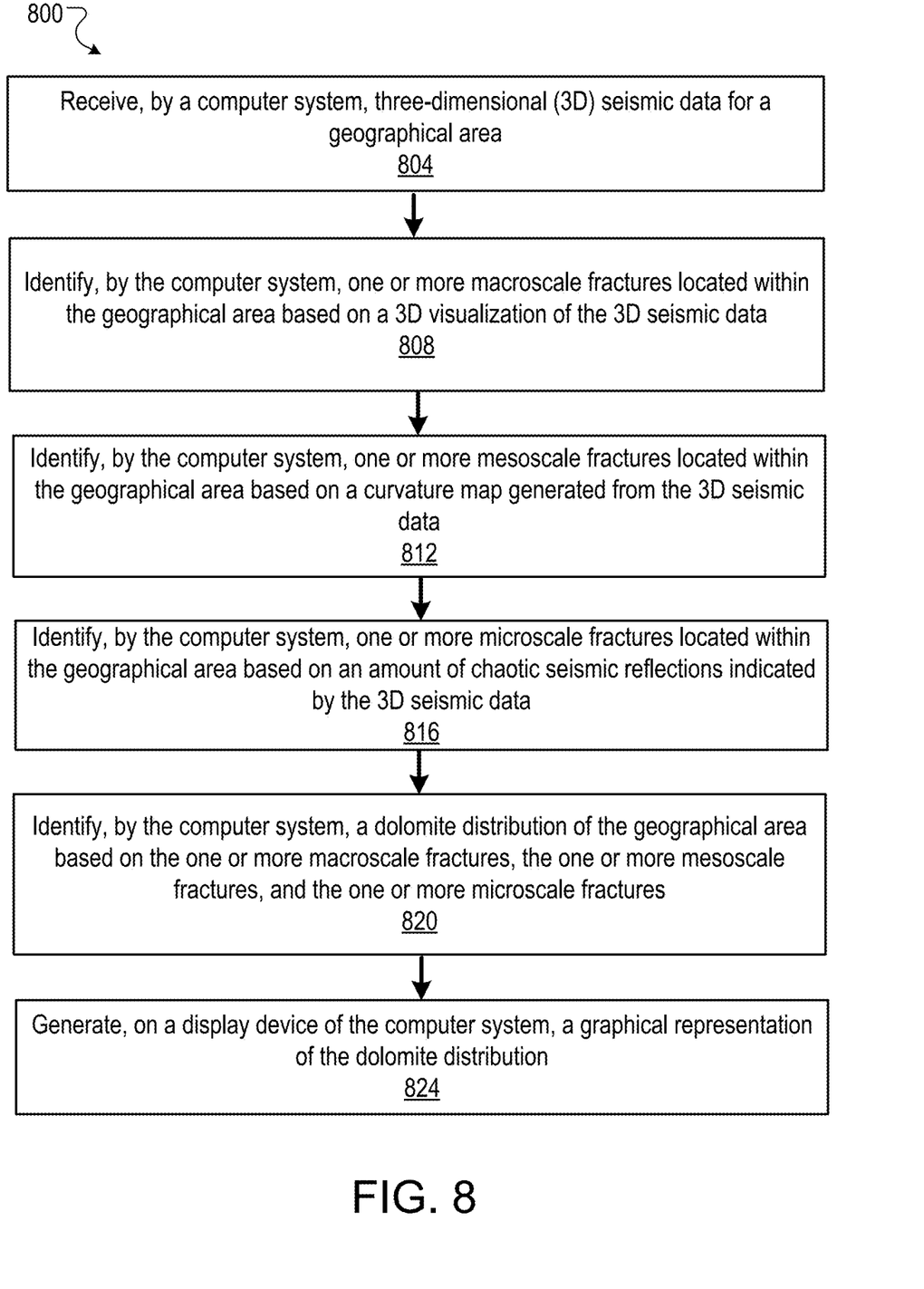
FIG. 8 illustrates a process for dolomite mapping using multiscale fracture characterization, in accordance with one or more implementations.

FIG. 8 illustrates a process 800 for dolomite mapping using multiscale fracture characterization, in accordance with one or more implementations. In some implementations, the process 800 is performed by the computer system 100 illustrated and described in more detail with reference to FIG. 1.

The computer system 100 receives 804 seismic data 132 for a geographical area 128. The seismic data 132 and the geographical area 128 are illustrated and described in more detail with reference to FIG. 1. In some implementations, the seismic data 132 includes multiple seismic traces. A seismic trace refers to a curve recorded by a seismograph when measuring ground movement. Each seismic trace includes an (X, Y) coordinate within the geographical area 128. The (X, Y) coordinate enables different locations in the geographical area 128 to be specified by a set of numbers, letters, or symbols. The seismic trace further includes a seismic travel time corresponding to the (X, Y) coordinate. The seismic travel time refers to a time taken by a seismic wave to travel from the geologic structure of the geographical area 128 to the (X, Y) coordinate. The seismic trace further includes a depth corresponding to the (X, Y) coordinate. The depth is derived from an acoustic wave travel time, based on an acoustic velocity of the subsurface medium (such as sediments, rocks, water, or a combination).

The computer system 100 identifies 808 one or more macroscale fractures located within the geographical area 128 based on a 3D visualization of the seismic data 132. A macroscale fracture 308 is illustrated and described in more detail with reference to FIGS. 1 and 3. In some implementations, the computer system 100 identifies the macroscale fractures located within the geographical area 128 based on a 3D visualization of the 3D volume of the seismic data 132. The size of a macroscale fracture is much greater than the seismic wavelength and is a field-wide fault (measured on a kilometer scale). Because of their large sizes, macroscale fractures have an apparent seismic response that is interpreted by performing image processing on the seismic data 132.

The computer system 100 identifies 812 one or more mesoscale fractures located within the geographical area 128 based on a curvature map 400 generated from the seismic data 132. A mesoscale fracture 404 and the curvature map 400 are illustrated and described in more detail with reference to FIGS. 1 and 4. Mesoscale fractures are harder to distinguish on a seismic section than macroscale fractures, but is identified using seismic attributes, such as curvature. A curvature map refers to a texture derived from the seismic data 132 that stores the convexity and concavity of the geologic formation.

The computer system 100 identifies 816 one or more microscale fractures 504 located within the geographical area 128 based on an amount of chaotic seismic reflections indicated by the seismic data 132. The example microscale fractures 504 are illustrated and described in more detail with reference to FIGS. 1 and 5. Microscale fractures 504 are far smaller than the seismic wavelength and are distributed in accordance with cross-bedding and ripple lamination (measured on a centimeter scale). Thus, a microscale fracture 504 is observed on core samples and thin sections using chaos and variance. Chaotic reflections indicate gravity-driven deposits, debrites, and a lack of lateral continuity. In some implementations, the fracture identification module 104 generates a chaos and a variance based on the seismic data 132. The chaos and the variance are indicative of the amount of chaotic seismic reflections.

The computer system 100 identifies 820 a dolomite distribution of the geographical area 128 based on the one or more macroscale fractures 308, the one or more mesoscale fractures 404, and the one or more microscale fractures 504. In some implementations, the dolomite distribution module 116 aggregates the macroscale fractures, the mesoscale fractures, and the microscale fractures into a composite fracture map of the geographical area 128. The composite fracture map refers to an aggregation of the individual seismic attribute maps along the target formation combined into a single fracture map. The dolomite distribution is identified based on the composite fracture map.

The computer system 100 generates 824 a graphical representation of the dolomite distribution on a display device 124. The display device 124 is illustrated and described in more detail with reference to FIG. 1. The display device 124 displays results of the processing by the processors 108. The display device 124 is implemented as a digital display on a smartphone, laptop, tablet, or desktop.

What is claimed is:

1. A method comprising:
   receiving, by a computer system, seismic data for a geographical area;
   identifying, by the computer system, one or more macroscale fractures located within the geographical area based on a three-dimensional (3D) visualization of the seismic data;
   identifying, by the computer system, one or more mesoscale fractures located within the geographical area based on a curvature map generated from the seismic data;
   identifying, by the computer system, one or more microscale fractures located within the geographical area based on an amount of chaotic seismic reflections indicated by the seismic data, wherein the chaotic seismic reflections are indicative of a lack of lateral continuity in the geographical area;
   aggregating, by the computer system, the one or more macroscale fractures, the one or more mesoscale fractures, and the one or more microscale fractures into a composite fracture map of the geographical location;
   identifying, by the computer system and based on the composite fracture map, a dolomite distribution of the geographical area; and
   generating, on a display device of the computer system, a graphical representation of the dolomite distribution.

2. The method of claim 1, wherein the seismic data comprises a plurality of seismic traces, and wherein each seismic trace of the plurality of seismic traces comprises:
   an (X, Y) coordinate within the geographical area;
   a seismic travel time corresponding to the (X, Y) coordinate; and
   a depth corresponding to the (X, Y) coordinate.

3. The method of claim 1, wherein the one or more macroscale fractures, the one or more mesoscale fractures, and the one or more microscale fractures indicate one or more directions of brine migration within the geographical area.

4. The method of claim 1, wherein the identifying of the one or more macroscale fractures comprises:
   processing, by the computer system, an image of one or more fault polygons based on the seismic data; and
   determining, by the computer system, an orientation of the one or more macroscale fractures based on the image of the one or more fault polygons.

5. The method of claim 1, wherein the identifying of the one or more microscale fractures comprises generating, by the computer system, a chaos and a variance based on the seismic data, wherein the chaos and the variance are indicative of the amount of chaotic seismic reflections.

6. The method of claim 1, further comprising:
   identifying, by the computer system, one or more diagenetic traps at the geographical location based on the dolomite distribution, wherein the one or more diagenetic traps are located on a border of the dolomite distribution; and
   generating, on the display device of the computer system, a graphical representation of the one or more diagenetic traps.

7. A non-transitory computer-readable storage medium storing instructions executable by a computer system, the instructions when executed by the computer system cause the computer system to:

receive seismic data for a geographical area;

identify one or more macroscale fractures located within the geographical area based on a three-dimensional (3D) visualization of the seismic data;

identify one or more mesoscale fractures located within the geographical area based on a curvature map generated from the seismic data;

identify one or more microscale fractures located within the geographical area based on an amount of chaotic seismic reflections indicated by the seismic data, wherein the chaotic seismic reflections are indicative of a lack of lateral continuity in the geographical area;

aggregate the one or more macroscale fractures, the one or more mesoscale fractures, and the one or more microscale fractures into a composite fracture map of the geographical location;

identify, based on the composite fracture map, a dolomite distribution of the geographical area; and generate, on a display device of the computer system, a graphical representation of the dolomite distribution.

8. The non-transitory computer-readable storage medium of claim 7, wherein the seismic data comprises a plurality of seismic traces, and wherein each seismic trace of the plurality of seismic traces comprises:

an (X, Y) coordinate within the geographical area;

a seismic travel time corresponding to the (X, Y) coordinate; and a depth corresponding to the (X, Y) coordinate.

9. The non-transitory computer-readable storage medium of claim 7, wherein the one or more macroscale fractures, the one or more mesoscale fractures, and the one or more microscale fractures indicate one or more directions of lateral brine migration within the geographical area.

10. The non-transitory computer-readable storage medium of claim 7, wherein the identifying of the one or more macroscale fractures comprises:

processing an image of one or more fault polygons based on the seismic data; and determining an orientation of the one or more macroscale fractures based on the image of the one or more fault polygons.

11. The non-transitory computer-readable storage medium of claim 7, wherein the instructions further cause the computer system to aggregate the one or more macroscale fractures, the one or more mesoscale fractures, and the one or more microscale fractures into a composite fracture map of the geographical location, and wherein the dolomite distribution is identified based on the composite fracture map.

12. The non-transitory computer-readable storage medium of claim 7, wherein the instructions further cause the computer system to:

identify one or more diagenetic traps at the geographical location based on the dolomite distribution, wherein the one or more diagenetic traps are located on a border of the dolomite distribution; and generate, on the display device of the computer system, a graphical representation of the one or more diagenetic traps.

13. A computer system comprising:

one or more computer processors; and a non-transitory computer-readable storage medium storing instructions executable by the one or more computer processors, the instructions when executed by the one or more computer processors cause the one or more computer processors to:

receive seismic data for a geographical area;

identify one or more macroscale fractures located within the geographical area based on a three-dimensional (3D) visualization of the seismic data;

identify one or more mesoscale fractures located within the geographical area based on a curvature map generated from the seismic data;

identify one or more microscale fractures located within the geographical area based on an amount of chaotic seismic reflections indicated by the seismic data, wherein the chaotic seismic reflections are indicative of a lack of lateral continuity in the geographical area;

aggregate the one or more macroscale fractures, the one or more mesoscale fractures, and the one or more microscale fractures into a composite fracture map of the geographical location;

identify, based on the composite fracture map, a dolomite distribution of the geographical area; and generate, on a display device of the computer system, a graphical representation of the dolomite distribution.

14. The computer system of claim 13, wherein the seismic data comprises a plurality of seismic traces, and wherein each seismic trace of the plurality of seismic traces comprises:

an (X, Y) coordinate within the geographical area;

a seismic travel time corresponding to the (X, Y) coordinate; and a depth corresponding to the (X, Y) coordinate.

15. The computer system of claim 13, wherein the one or more macroscale fractures, the one or more mesoscale fractures, and the one or more microscale fractures indicate one or more directions of lateral brine migration within the geographical area.

16. The computer system of claim 13, wherein the identifying of the one or more macroscale fractures comprises:

processing an image of one or more fault polygons based on the seismic data; and determining an orientation of the one or more macroscale fractures based on the image of the one or more fault polygons.

17. The computer system of claim 13, wherein the identifying of the one or more microscale fractures comprises generating a chaos and a variance based on the seismic data, wherein the chaos and the variance are indicative of the amount of chaotic seismic reflections.

* * * * *